US008802197B2

(12) United States Patent
Alm et al.

(10) Patent No.: US 8,802,197 B2
(45) Date of Patent: Aug. 12, 2014

(54) METHOD OF PRODUCING AN ARTICLE COMPRISING AN INTERPENETRATING POLYMER NETWORK (IPN) AND AN ARTICLE COMPRISING AN IPN

(75) Inventors: Martin Alm, Greve (DK); Maike Benter, Roskilde (DK); Anne Marie Jensen, Copenhagen (DK); Joachim Karthäuser, Sollentuna (SE); Kjeld Schaumburg, Herlev (DK)

(73) Assignee: PTT Holding APS, Lyngby (DK)

( * ) Notice: Subject to any disclaimer, the term of this patent is extended or adjusted under 35 U.S.C. 154(b) by 758 days.

(21) Appl. No.: 12/513,314

(22) PCT Filed: Nov. 5, 2007

(86) PCT No.: PCT/DK2007/050162
§ 371 (c)(1),
(2), (4) Date: May 1, 2009

(87) PCT Pub. No.: WO2008/052568
PCT Pub. Date: May 8, 2008

(65) Prior Publication Data
US 2010/0040870 A1    Feb. 18, 2010

(30) Foreign Application Priority Data

Nov. 3, 2006   (DK) .......................... PA 2006 01439

(51) Int. Cl.
B05D 3/00 (2006.01)
B05D 5/00 (2006.01)
B05D 7/00 (2006.01)
B05D 7/02 (2006.01)

(52) U.S. Cl.
USPC ........ 427/393.5; 427/307; 427/322; 427/384; 427/385.5; 521/51; 521/82; 521/134; 521/139; 525/50; 525/100; 525/474; 525/479; 525/242; 525/244; 525/426; 525/445; 525/455; 525/468; 525/518; 428/304.4; 428/305.5; 428/306.6; 428/308.4; 428/318.4; 428/319.3; 428/319.7; 428/319.9

(58) Field of Classification Search
None
See application file for complete search history.

(56) References Cited

U.S. PATENT DOCUMENTS

| | | | | |
|---|---|---|---|---|
| 4,423,099 A | * | 12/1983 | Mueller et al. | 428/35.2 |
| 5,663,237 A | * | 9/1997 | Lee et al. | 525/285 |
| 5,688,870 A | * | 11/1997 | Wilkinson et al. | 525/244 |
| 6,011,082 A | * | 1/2000 | Wang et al. | 523/107 |
| 6,214,260 B1 | * | 4/2001 | Bessette et al. | 252/511 |
| 6,224,893 B1 | * | 5/2001 | Langer et al. | 424/423 |
| 6,251,965 B1 | * | 6/2001 | Wang et al. | 523/107 |
| 6,331,578 B1 | * | 12/2001 | Turner et al. | 523/105 |
| 7,377,939 B2 | * | 5/2008 | Williams et al. | 623/1.46 |
| 7,687,585 B2 | * | 3/2010 | Karthauser | 525/474 |
| 2002/0052448 A1 | * | 5/2002 | Wang et al. | 525/242 |
| 2002/0122946 A1 | | 9/2002 | Kuck et al. | |
| 2003/0000028 A1 | * | 1/2003 | Molock et al. | 8/506 |
| 2005/0158472 A1 | * | 7/2005 | Karthauser | 427/299 |
| 2006/0148985 A1 | | 7/2006 | Karthauser | |
| 2007/0004812 A1 | * | 1/2007 | Karthauser et al. | 521/40 |
| 2007/0216061 A1 | | 9/2007 | Karthauser et al. | |
| 2008/0213460 A1 | * | 9/2008 | Benter et al. | 427/2.1 |

FOREIGN PATENT DOCUMENTS

| | | | |
|---|---|---|---|
| JP | 2005-213454 | * | 8/2005 |
| JP | 2005-255964 | * | 9/2005 |
| WO | WO 98/40425 A1 | | 9/1998 |
| WO | WO 02/052448 A1 | | 7/2002 |
| WO | WO 03/068846 A1 | | 8/2003 |
| WO | WO 2005/003237 A1 | | 1/2005 |
| WO | WO 2005/055972 A3 | | 6/2005 |
| WO | WO 2005/071696 A1 | | 8/2005 |
| WO | WO 2006/045320 A2 | | 5/2006 |
| WO | WO 2006/074666 A2 | | 7/2006 |

OTHER PUBLICATIONS

*International Search Report (PCT/ISA/210) dated Jan. 16, 2008.

* cited by examiner

*Primary Examiner* — Vivian Chen
(74) *Attorney, Agent, or Firm* — Buchanan Ingersoll & Rooney PC

(57) ABSTRACT

The invention relates to a method of producing an article comprising an interpenetrating polymer network (IPN) and an IPN comprising article e.g. obtainable by this method. The method comprises providing a polymer substrate e.g. shaped to provide the desired article and applying it in a reaction chamber, providing at least one monomer for an interpenetrating polymer, exposing said polymer substrate in said reaction chamber to said at least one monomer in the presence of an impregnation solvent comprising $CO_2$ under conditions wherein said $CO_2$ is in its liquid or supercritical state and polymerizing and optionally cross linking said at least one monomer to form an interpenetrating polymer in the presence of a polymerization solvent under conditions wherein at least a part of said at least one monomer is dissolved in said polymerization solvent. The article comprises a body formed of a polymer substrate and an interpenetrating polymer of a second polymer different from the polymer of the polymer substrate and an outer surface layer on at least a part of its surface of said second polymer.

20 Claims, No Drawings

METHOD OF PRODUCING AN ARTICLE COMPRISING AN INTERPENETRATING POLYMER NETWORK (IPN) AND AN ARTICLE COMPRISING AN IPN

TECHNICAL FIELD

The present invention relates to a method of producing an article comprising an interpenetrating polymer network (IPN) as well as an article comprising an IPN optionally being produced according to the method of the invention.

BACKGROUND ART

IPNs have been known for more than 40 years. IPNs are defined as macromolecular assemblies comprising two or more polymers wherein at least one is in the form of a network, the polymers are at least partially interlaced on a molecular scale but not covalently bonded to each other.

Because there is no chemical bond between the networks (or polymer/network), each network may retain its individual properties independently of its individual proportion in the blend. As a result an improvement can be attained in properties such as mechanical strength, impact resistance, and toughness and other. There are two main types of IPNs, viz semi-IPN where at least one component is not in network form, and full IPN where all species are in network form. The term "IPN" as used herein comprises both semi-IPNs and full IPNs.

US 2002/01222946 relates to a process of producing an IPN comprising: providing a liquid mixture comprising silicone oligomers and silsesquioxane oligomers; and curing the liquid mixture to form a composition of first and second polymers, the first polymer comprising the silsesquioxane oligomers cross-linked by siloxane bonds and the second polymer comprising a cross-linked silicone network formed in part from the silicone oligomers.

US 20030000028 provides a colorant for use in tinting contact lenses in which the binding polymer used is capable of forming an interpenetrating polymer network with the lens material. When the colorants of the invention are applied to uncured lens material that is subsequently cured, the binding polymer forms an interpenetrating polymer network with the lens material embedding the colorant within the lens material, resulting in a stable, tinted lens.

Several other methods for producing IPNs are known. The methods e.g. include simultaneously forming and cross-linking the polymer networks in the presence of each other. Other methods include forming a first network and thereafter swelling this network with monomers, cross-linking agents and optionally initiator/catalyst with or without solvents where after this monomer may form a polymer and optionally a network, e.g. as disclosed in US 2002/0052448.

Applicants co-pending US 2006/0148985 relates to a method of producing an IPN by forming a first polymer substrate and thereafter swelling this substrate with monomers in the presence of $CO_2$ in supercritical or liquid state. The monomers may be induced to form a polymer and optionally cross-linked to form a network.

SUMMARY OF INVENTION

The inventors of the present invention have surprisingly found a method of producing an IPN comprising article while simultaneously providing said article with pre-selected surface properties which can be different from the properties of the substrate used for forming the article.

This new method thus provides the possibility of designing the surface characteristics of the IPN comprising article in a very simple matter.

The method further provides the possibility of adding a layer of a selected polymer onto the surface of the substrate, which layer is integrated with the interpenetrating polymer and thereby is fixed very strongly to the substrate.

As it will appear from the following description the method provides the possibility of producing new articles with desired surface characteristics which articles are very coherent.

The method and the article of the invention are defined in the claims.

The method of the invention comprises
i) providing a polymer substrate and applying it in a reaction chamber,
ii) providing at least one monomer for an interpenetrating polymer,
iii) exposing said polymer substrate in said reaction chamber to said at least one monomer in the presence of an impregnation solvent comprising $CO_2$ under conditions wherein said $CO_2$ is in its liquid or supercritical state and
iv) polymerizing said at least one monomer to form an interpenetrating polymer in the presence of a polymerization solvent under conditions wherein at least a part of said at least one monomer is dissolved in said polymerization solvent.

The interpenetrating polymer may e.g. be cross-linked as explained further below.

The substrate may preferably be shaped to provide the desired article prior to being applied in the reaction. In particular it is desired that the substrate is at least pre-shaped such that at least a part of the surface of the substrate when applied in the reaction chamber is maintained in the final article.

The polymer substrate may be any polymeric substrate which is not dissolved by the impregnation solvent. The polymer substrate should preferably be at least partly swellable in the impregnation solvent to thereby provide a suitable method of impregnating polymer substrate with the desired monomer(s).

Examples of suitable polymer substrates comprise polymer substrate selected from the group consisting of rubber substrates, such as silicone rubber, isoprene rubber, urethane rubber, ethylene-acrylate rubber (EPCM), ethylene propylene diene monomer rubber (EPDM), nitrile rubber (NBR), styrene-butadiene rubber (SBR) and latex, or said polymer substrate comprises a carbon-carbon backbone substrate such as thermoplastic and/or elastomer polymer.

In one embodiment the polymer substrate is selected from the group consisting of polyolefins, polyvinyls, polyesters, polyacrylates, polyethers, polyurethane, polycarbonate, SEBS, SBS, SIS, TPE-polyether-amide, TPE-polyether-ester, TPE-urethanes, TPE PP/NBR, TPE-PP/EPDM, TPE-vulcanisates and TPE-PP/IIR, and mixtures thereof.

In one embodiment the polymer substrate is a silicone rubber comprising substrate and comprises at least 10%, such as at least 20%, such as at least 40%, such as at least 60% by weight of polymer having a backbone consisting of Si and O atoms or consisting of Si atoms. The polymer substrate may preferably comprise one or more polymers selected from the group consisting of poly(dimethyl siloxane), poly(methylphenyl siloxane), fluorosilicone rubber, silicone esters, polysiloxanes, polysilanes, chlorosilanes, alkoxysilanes, aminosilanes, polysilanes, polydialkylsiloxanes, polysiloxanes containing phenyl substituent(s), said polymers of the polymer substrate optionally being vinyl-functionalized and/or optionally being partially or fully fluorinated.

In one embodiment the polymer substrate comprises a silicone co-polymer/rubber and/or a grafted silicone e.g. grafted with 2-hydroxyethyl methacrylate (HEMA).

If the polymer substrate is a rubber substrate which is or comprises a rubber, said rubber substrate may preferably be at least partially vulcanized, such as up to a vulcanization degree (cross-linking degree) of at least 10%, such as at least 50%, such as at least 80% or wholly, such as at least 96%, such as at least 97%, such as at least 98%.

The degree of vulcanization may depend on the type of rubber used and the article produced. The skilled person will for a given rubber and a given article in aim, be able to select a useful vulcanization degree.

The polymer substrate may e.g. be of a composite material or e.g. be a substrate of two or more polymer elements fixed to each other e.g. by gluing or other well known methods. The polymer substrate may be pre-coated if desired e.g. using plasma deposition or wet chemical application, provided that the monomer still can be incorporated (impregnated) at least partly into the polymer substrate. The polymer substrate may additionally be subjected to heat treatment and/or cold tempering (e.g. ad described in WO06045320).

In one embodiment the polymer substrate comprises low molecular weight residuals, and the method further comprises extracting at least a part of the low molecular weight residuals from the polymer substrate prior to subjecting said polymer substrate to said at least one monomer, said extraction preferably being performed by subjecting said polymer substrate to a $CO_2$ containing extraction solvent under conditions wherein $CO_2$ is in its liquid or its supercritical state.

Low molecular weight residuals are herein defined as residuals which are in liquid state at 1 atm. and 50° C.

In one embodiment the said polymer substrate is transparent, preferably transparent for visible light having a wavelength of 400-700 nm. The polymer substrate may for example have a refractive index in the interval of 1.2-1.65. As mentioned the polymer substrate may be shaped to have a desired shape for use.

In one embodiment the polymer substrate is shaped prior to the treatment, which results in at least an outer surface layer (a coating) applied onto the substrate and an interpenetrating polymer at least in a layer of the substrate (extending into a desired depth of the substrate such as 1 μm or deeper, such as 10 μm or deeper), where the method further comprises cutting a section of the substrate off to expose a surface without the coating.

In principle any method of shaping the substrate can be used. Examples of methods for shaping include stamping, extrusion, injection molding, calendaring, casting, cutting, pressing, dipping and combinations thereof.

In one embodiment the shaping is performed prior to the vulcanization. In one embodiment the shaping is performed after the vulcanization. In one embodiment the shaping is performed simultaneously with the vulcanization.

The interpenetrating polymer also called the second polymer may be provided by one or more monomers. By selecting the monomer(s) the resulting article may be provided by desired properties.

The monomer(s) may preferably be selected such that the interpenetrating polymer obtains a different composition than the composition of the polymer substrate.

In one embodiment the monomer(s) is/are free radical polymerizable monomer(s). The monomer(s) may thus preferably comprise at least one C=C double bond or triple bond. In one embodiment the monomers(s) are ring opening polymerizable (β-lactones), or anionic (Urethanes), Examples of useful monomers comprise the monomers selected from the group consisting of silicone containing monomers, such as silanes, e.g. tetraethylorthosilicate or tetraethoxysilane (TEOS) or chloro- or alkoxy-functional silanes; olefins such as ethylene, propylene, n-vinyl pyrolidone (nVP), styrene; oxygen-, phenyl, amino and nitrogen-containing monomers, such as acrylic and methacrylic derivatives, e.g. acrylic esters, acrylic acids, methacrylic acid and -esters, alkyl and hydroxyalkyl acrylates and methacrylates; functionalized methacrylates such as 2-hydroxyethyl methacrylate (HEMA), glycerol monomethacrylate (GMMA), heptaflurobutyl acrylate (HFBA), 2-methacryloyloxyethyl phosphorylcholine (MPC) and [2-(methacryloyloxy)ethyl]-dimethyl-(3-sulfopropyl)-ammonium hydroxide (Betain); alkyl substituted acrylates and methacrylates such as methyl methacrylate (MMA), ethyl methacrylate (EMA), butyl methacrylate (BMA), dodecyl methacrylate (DMA); urethanes; mono- and di-functional alcohols; carboxylic acids; amines; isocyanates; epoxides; aromatic compounds such as aromatics carrying substituent(s) such as alkyl groups and sulfonated aromatics, aromatic resins, imidazol and imidazol derivatives; pyrazoles; quaternary ammonium compounds; polyurethane prepolymers; epoxy resins; substituted β- and γ-lactones, lactic acid monomers; carbohydrides and fluorinated monomers.

Functionalization e.g. of methacrylates may e.g. be performed prior or post to exposing the silicone rubber to the monomers.

The above monomer(s) may be combined with each other in any combination to provide the article with the desired properties.

It is in general preferred that the monomer(s) is/are selected such that the monomer(s) in polymerized condition (i.e. the interpenetrating polymer also called second polymer) has at least one physical property which is different from said at least one physical property of the polymer substrate. The physical property may in principle be any physical properties. In one embodiment the at least one physical property preferably is selected from the group consisting of hardness, permeability, stiffness, hydrophilicity, glass transition temperature (Tg) and refractive index (RI).

In one embodiment the interpenetrating polymer is a material with a more hydrophilic structure than the polymer substrate.

In one embodiment the interpenetrating polymer is a material with a more hydrophilic surface than the polymer substrate.

In one embodiment the interpenetrating polymer is a material with a higher stiffness than the polymer substrate.

In one embodiment the interpenetrating polymer is a material with a lower permeability than the polymer substrate.

In one embodiment the interpenetrating polymer is a harder material than the polymer substrate.

Other combinations of physical properties of the interpenetrating polymer and the polymer substrate will be evident to the skilled person.

In one embodiment the interpenetrating polymer is also covering the major part of the surface of the substrate.

In one embodiment the method comprises exposing said polymer substrate to at least two monomers and said impregnation solvent under conditions where said $CO_2$ is in its liquid or supercritical state. In this embodiment the monomers may be polymerized under conditions where only one of the monomers is dissolved in the polymerization solvent or two or more of the monomers may be dissolved in the polymerization solvent during polymerization. Thereby the interpenetrating polymer may have a different composition than the coating (outer layer applied onto the substrate) generated on the surface of the substrate, but still the interpenetrating polymer and the coating will be at least partly integrated with each other.

Depending on the types of monomers used and the concentration of the polymers the two or more monomers may form a co-polymer or two or more homo-polymers which may be physically linked but essentially not chemically linked.

The co-polymer may e.g. a block-co-polymer ($r_1 \ll r_2$ or $r_1 \gg r_2$), an alternating co-polymer ($r_1 \approx r_2 \approx 0$) or a random co-polymer ($r_1 \approx r_2 \approx 1$).

The interpenetrating polymer may thus in practice comprise two or more physically interconnected polymers which are not chemically linked or only partly linked to each other. Such embodiments are also within the scope of the invention. The term "interpenetrating polymer" as well as the term "second polymer" therefore includes physically interconnected polymers.

Where the interpenetrating polymer is made from two or more monomers the interpenetrating polymer preferably is or comprises a co-polymer. Where the interpenetrating polymer is made from two monomers a random co-polymer may be obtained by selecting the monomers such that their reaction values $r_1$ and $r_2$ are less than 2, or preferably less than 1.3 wherein $$r_1 = (Q_1/Q_2)\exp[-e1(e1-e2)] \text{ and}$$

$$r_2 = (Q_2/Q_1)\exp[-e2(e2-e1)] \text{ where}$$

$Q_1$=denotes the intrinsic reactivity of the first monomer,
$Q_2$=denotes the intrinsic reactivity of the second monomer, and
e1=denotes the polarity of the first monomer, and
e2=denotes the polarity of the second monomer.

The values Q and e for the various monomers can be found in reference books, such as Polymer Handbook, by Brandrup, J. and Immergut, E. H. and Grulke, E. A. Wiley-Interscience, John Wiley and Sons, Fourth Edition, 1999 USA (ISBN 0-471-47936-5).

The two monomers may be introduced into the reaction chamber one-by-one, simultaneously, or partly overlapping with each other in time. The molar amount of the respective monomers may be equal or different from each other.

By adding the monomers at different stages a gradient of the interpenetrating polymer may be obtained in the final article. The interpenetrating polymer may thus have one composition in the central part of the article and another at the surface layer of the article. Such interpenetrating polymer with a composition which is gradually changing from the inner part of the article to the surface part of the article may also be obtained by gradually changing the solvent or the solvent condition during the impregnation and/or polymerization e.g. while simultaneously changing the monomer composition in the reaction chamber. In one embodiment an interpenetrating polymer with a composition which is gradually changing from the inner part of the article to the surface part of the article is obtained by using two or more monomers having different diffusion properties/speed into said polymer substrate.

The introduction of said one or more monomers into the reaction chamber may take place before, during or after the $CO_2$ and optional co-solvent is introduced.

The impregnation solvent and the polymerization solvent may be essentially identical in composition or they may be different, while still being a solvent for at least one monomer in the reaction chamber.

The impregnation solvent and the polymerization solvent may independently of each other comprise at least 10%, such as at least 30%, such as at least 50%, such as at least 75%, such as at least 90% by weight of one or more of the components selected from the group consisting of $CO_2$, and $N_2O$, and $C_1$-$C_5$ hydrocarbons. The impregnation solvent/polymerization solvent (meaning the impregnation solvent and the polymerization solvent independently of each other) may preferably comprise at least 50%, such as at least 90% of $CO_2$.

The impregnation solvent/polymerization solvent may further comprise a surfactant preferably selected from the group of anionic, cationic, non-ionic and amphoteric surfactants, said impregnation solvent preferably comprising up to 5% by weight, such as between 0.001-50 grams of surfactant per kg impregnation solvent.

The impregnation solvent/polymerization solvent may further comprise a co-solvent, preferably selected from water and the group consisting of organic solvents such as hexane, benzene, methanol, ethanol, chloroform, xylene, iso-butanol, propanol, acetone, ethylene glycol and mixtures thereof including mixtures of organic solvent(s) and water. The list is not limited to the mentioned solvents.

The polymerization solvent need not to be swelling the polymer substrate and the group of useful polymerization solvents is thus including additional solvents than the group of solvent for the impregnation solvent. In one embodiment the polymerization solvent comprises one or more of the components from the group of N2, argon and $C_1$-$C_{12}$ hydrocarbons, preferably $C_3$-$C_4$ hydrocarbons, more preferably selected from the group consisting of propane, propene, isobutane, butane, butene, isobutene, methanol, acetone and $CO_2$, more preferably the polymerization solvent comprises $CO_2$.

It should be observed that the polymerization solvent need not comprise $CO_2$ or any other component in liquid/supercritical state during the polymerization.

The polymerization solvent may comprise one or more of the components in its/their liquid or supercritical state during the polymerization of the monomer(s). The polymerization solvent may preferably comprise $CO_2$ in its liquid or supercritical state during the polymerization of the monomer(s).

It is preferred that at least one monomer is present in the reaction chamber during at least a part of the polymerization and preferably that at least a part of said at least one monomer is not impregnated in the substrate and is present in a dissolved state in the reaction chamber. Preferably the at least one monomer is present in non-impregnated condition in the reaction chamber in a concentration of at least 1% by volume of the reaction chamber, such as at least 5% by volume, such as at least 10% by volume of the reaction chamber.

The concentration of the monomer measured by volume of the reaction chamber is determined by the volume of the monomer in non-dissolved state measured at 20° C. and 1 bar.

Preferably the at least one monomer is present during the polymerization in non-impregnated condition in the reaction chamber in a concentration which is sufficient for generation of a coating of the surface of the substrate upon polymerization of the monomer. If the monomer concentration in the polymerization solvent is too low it may be difficult or at least very time consuming to generate a coating on the surface of the substrate. Thus in one embodiment the at least one monomer is present during the polymerization in non-impregnated condition in the reaction chamber in a concentration which is sufficient for generation of a coating of the surface of the substrate upon polymerization of the monomer.

In one embodiment at least one radical starter (also called initiator) is incorporated into the polymer substrate, preferably by physical compounding, by swelling or impregnation in dissolved condition, or by co-impregnation with the one or more monomers, or it may be added to the reactor after said monomer(s) are impregnated into said polymer substrate. The amount of radical starter should preferably be sufficient to initiate the polymerization and preferably be sufficient to ensure a sufficient molecular weight (Mw).

The molecular weight of the resulting polymer(s) can be adjusted by controlling the amount of added radical starter.

The skilled person will by a few experiments be able to select a useful amount of radical starter for a given polymerization process.

A large number of radical starters (often called free radical initiators) are available; they may be classified into four major types: 1) Peroxides and hydroperoxides, 2) azo compounds, 3) redox initiators, and 4) compounds that form radicals under the influence of light (photo initiators). Any of these types of radical starters may in principle be used.

In one embodiment the radical starter is selected from the group consisting of peroxides such as diethyl peroxydicarbonate (DEPDC), benzoyl peroxide (BPO) and dicumylperoxide; hydro-peroxide; azo-compounds such as azo-bis-isobutyronitril (AIBN); redox initiators and photoinitiators such as benzoyl-based radical starters, said radical starter preferably being heat- or radiation activatable.

If BPO is used as radical starter the polymerization solvent should preferably be essentially free of $CO_2$ because $CO_2$ has been found to inhibit the decomposition of BPO and thereby inhibit the generation of free radical by the BPO.

In one embodiment at least one cross-linking agent is incorporated into the polymer substrate, preferably by physical compounding, by swelling or impregnation in dissolved condition, or by co-impregnation with the one or more monomers. A useful amount and type of cross-linking agent may easily be found by the skilled person. Examples of cross-linking agents include 1,3,5-Triallyl-1,3,5-triazine-2,4,6(1H,3H,5H)-trione (TTT) and ethylene glycol dimethacrylate (EGDMA).

In general it is difficult to polymerize all of the impregnated monomer(s) and most often the article will comprise non-polymerized monomer(s) after termination of the polymerization. In one embodiment the method further comprises extracting at least a part of said non-polymerized monomer(s) from the article after termination of polymerization: The extraction of non-polymerized monomer(s) preferably is performed by subjecting the article to a $CO_2$ containing extraction solvent under conditions wherein $CO_2$ is in its liquid or its supercritical state e.g. as described in US WO06045320 and e.g. using an extraction solvent which independently of the composition of the impregnation solvent has a composition as described above for the impregnation solvent.

The depth of the interpenetrating polymer into the polymer substrate depends largely on the type of monomer(s), the type and cross-linking degree of the polymer substrate and the impregnation condition, including the time of impregnation.

The polymer substrate may preferably be exposed to said monomer(s) and said impregnation solvent for a sufficient time to impregnate a sufficient amount of said monomer(s) into the polymer substrate for providing an interpenetrating polymer from said monomer(s) into a depth of at least 0.1 µm, preferably at least 1 µm of said polymer substrate upon polymerization of said monomer(s). The interpenetrating polymer may e.g. be crosslinked to form a network.

In one embodiment the polymer substrate is exposed to said monomer(s) and said impregnation solvent under conditions where $CO_2$ is in its liquid and/or its supercritical state, under conditions where polymerization of said at least one monomer is not initiated and for a sufficient time to impregnate a sufficient amount of said monomer(s) into said polymer substrate for providing an interpenetrating polymer from said monomers into a depth of at least 0.1 µm, preferably least 1 µm of said polymer substrate upon polymerization of said at least one monomer.

The pressure and the temperature may be varied during the impregnation and/or during the polymerization.

Variation of the temperature and or pressure may e.g. be used to initiate the polymerization of the monomer(s).

In one embodiment the polymer substrate is exposed to the monomer(s) and the impregnation solvent at a first pressure, followed by an increase in the pressure to thereby initiate polymerization of said monomer(s).

In one embodiment the polymer substrate is exposed to the monomer(s) and the impregnation solvent at a first temperature, followed by an increase in the temperature to thereby initiate polymerization of said monomer(s).

In one embodiment the polymerization is initiated by heat wherein the elements of the polymerization solvent are in liquid and/or gas form.

In one embodiment the polymerization is initiated by irradiation e.g. using infrared irradiation (IR) or ultraviolet irradiation (UV). A laser may e.g. be used for performing the irradiation.

In one embodiment the polymer substrate is exposed to the monomer(s) and the impregnation solvent where after the polymerization of said monomer(s) is initiated using UV light.

In one embodiment the polymer substrate is exposed to the radical starter and the impregnation solvent (e.g. in the presence of monomer(s) or preferably not in the presence of monomer(s)), where after the polymer substrate is exposed to monomer(s) and said impregnation solvent while said radical starter is simultaneously being initiated using UV light.

In one embodiment the polymer substrate is exposed to the monomer(s) and the impregnation solvent for a sufficient time to impregnate at least a part of the monomer(s), where after the impregnation solvent is removed and a polymerization solvent comprising monomer and having another composition than the removed impregnation solvent is introduced and polymerization of monomer(s) is initiated. In this embodiment the polymerization solvent may likely be free of $CO_2$.

The polymerization of said monomer(s) is performed under conditions where a layer of polymer is polymerized from one or more of said monomer(s) onto at least one surface part of said polymer substrate. By polymerizing the monomer(s) under conditions where at least a part of the monomer(s) is dissolved in the polymerizing solvent, such a layer of polymer can be polymerized from said monomer(s) onto at least one surface part of said polymer substrate.

In one embodiment the polymer substrate is exposed to at least two monomers, which monomers are polymerized so that an interpenetrating polymer network is formed from said at least two monomers. The interpenetrating polymer may e.g. be cross-linked. The two monomers may preferably be polymerized to form an alternating co-polymer, a block co-polymer or even more preferably a random co-polymer.

In one embodiment the resulting article has at least one physical property which differs from the corresponding physical property of said polymer substrate. The at least one physical property may e.g. be selected from the group consisting of hardness, permeability, stiffness, hydrophilic character, glass transition temperature (Tg) and refractive index (RI) e.g. as described above.

The method of the invention may comprise the additional step of incorporating a drug to provide a drug delivering device e.g. as described in WO05055972. The drug may be incorporated into the substrate prior to providing the IPN, simultaneously with loading monomer for the interpenetrating polymer or after having polymerized the monomers to form the interpenetrating polymer.

In one embodiment the method of the invention comprises the additional step of incorporating a drug to provide a drug delivering device where the drug is incorporated into the substrate prior to or simultaneously with loading monomer for the interpenetrating polymer, the impregnation solvent with monomer and drug is removed from the reactor and polymerization solvent and monomer are added for performing the polymerization to thereby provide the interpenetrating polymer and an outer coating essentially free of drug. The outer coating may for example be provided such that it needs penetration in order to initiating release of drug, or the drug may slowly migrate through the coating to be released at its surface.

The method of the invention may comprise the additional step of incorporating one or more metal salts or metal complexes such alkali metal salt, alkaline earth metal salt, and salts of one or more of the group consisting of silver, boron, platinum, zirconium, iron, ruthenium, palladium, aluminum, gallium, silicium and copper. The metal salt/complex may be incorporated into the substrate prior to providing the IPN, simultaneously with loading monomer for the interpenetrating polymer or after having polymerized the monomers to form the interpenetrating polymer.

The article of the invention may be obtained by the method described above

The article of the invention may preferably comprise a body formed of a polymer substrate and an interpenetrating second polymer (also called the interpenetrating polymer), which second polymer is different from the polymer of the polymer substrate and an outer surface layer on at least a part of its surface of a polymer polymerized from at least one monomer which is also used in the polymerization to form said second polymer. The interpenetrating polymer may e.g. be cross-linked to form a network.

The polymer substrate and the composition of the polymer substrate may be as described above.

The composition of the second polymer (interpenetrating polymer) may be as described above. The composition of the second polymer may vary from the inner part of the article to the surface layer of the article also as described above.

In one embodiment the article comprises a body formed of a rubber substrate and an interpenetrating non-rubber polymer and an outer surface layer on at least a part of its surface of said non-rubber polymer. This embodiment has many advantages in particular if the rubber is a silicone rubber. Silicone rubber is accepted for use in close contact to the mammal body including in contact with mammal mucous membranes. By using silicone rubber as the polymer substrate many new articles with desired properties may be produced including implants, contact lens, catheters, stents, medical articles, medical devices, hearing aid elements, baby care articles and other elements for use in contact with humans and/or animals. Membranes for transporting ions, proteins, enzymes, and other water soluble compounds, (many applications within bio, medical, fuel cells, osmosis, filtration).

In one embodiment the article comprises a body formed of a polymer substrate and an interpenetrating polymer of a second polymer and an outer surface layer on essentially its entire surface of said second polymer.

The outer surface layer may have any desired thickness, for example the outer surface layer has a thickness of at least 100 nm, such as at least 100 µm.

In one embodiment the second polymer has at least one physical property which differs from the corresponding physical property of the polymer substrate. The at least one physical property may be as disclosed above and preferably be selected from the group consisting of hardness, permeability, stiffness, hydrophilic character, glass transition temperature (Tg) and refractive index (RI).

In one embodiment the second polymer has a more hydrophilic surface than an exposed surface of the polymer substrate.

An exposed surface of the polymer substrate means a surface of the polymer substrate within the article exposed by cutting through the article.

In one embodiment the second polymer has a lower permeability than the polymer substrate.

In one embodiment the second polymer has a higher stiffness than the polymer substrate.

In one embodiment the second polymer is harder than the polymer substrate.

In one embodiment the second polymer is formed from polymerization of one or more monomers comprising a methacrylate, preferably 2-hydroxyethyl methacrylate.

In one embodiment the article is essentially transparent.

In one embodiment the second polymer is an alternating co-polymer.

In one embodiment the second polymer is a random co-polymer.

In one embodiment the second polymer is a block co-polymer.

In one embodiment the article is a contact lens or a medical device such as a device adapted to be used in contact with mammal mucous membranes. Examples of articles of the invention include the above mentioned articles as well as brain shunts, catheters and artificial blood veins.

EXAMPLES

Example 1

Rubber Substrate

Discs with a radius of 5.0 mm were punched out of a 1.00 mm thick sheet of Elastosil LR 3003/10 silicone rubber supplied by Wacker Silicones (Germany). The discs were used as substrate material for producing the interpenetrating polymer networks. All discs were extracted in $scCO_2$ to remove low molecular weight residuals, before they were used as substrate material.

Monomers:

98% 2-hydroxyethyl methacrylate (HEMA) with 200 ppm monomethyl ether hydroquinone as inhibitor supplied by Acros Organics (MB, Belgium) was purified by distillation at reduced pressure, and the fraction at 67° C. and 3.5 mbar was collected and stored under an argon atmosphere at 5° C.

97% 1H,1H-heptafluorobutyl acrylate supplied by ABCR (Karlsruhe, Germany) was stored at 5° C. and used as received.

Radical Starter:

Diethyl peroxydicarbonate (DEPDC) was synthesized from 98% Ethyl chloroformat (supplied by Fluka Chemie (Buchs CH)) and 30% $H_2O_2$ and NaOH pellets (Supplied by Bie & Berntsen (Rødovre, DK) and stored in hexane (0.15 M) under an argon atmosphere at −18° C. 98%.

Cross Linking Agent:

1,3,5-triallyl-1,3,5-triazine-2,4,6-(1H,3H,5H)-trione (TTT) supplied by Fluka Chemie (Germany) was used as received as cross-linking agent and stored under an argon atmosphere at 5° C.

Solvent $CO_2$ N48 was supplied by Air Liquid Denmark A/S (Denmark) and used as received.

96% ethanol (EtOH) and 99.9% ethylene glycol were used as co-solvent.

A 5 ml stainless steel high-pressure reactor was used for the experiments. A Thar P-50 electrical driven pressure pump from Thar Design Inc. USA, was applied for assuring the operation pressure. The pump was equipped with a heat exchanger and was supplied with cooling water at 5° C.

In a typical experiment a number of extracted discs of silicone (m~150 mg/disc), 200 μl TTT are placed in the reactor, with 1-2 ml co-solvent. Then the reactor is closed and pressurized to about 50 bars at 25° C. The monomer is injected into the reactor (0.64 mL HEMA and 0.64 mL HFBA). Then the reactor is heated to 75° C. and $CO_2$ is added to ensure a pressure of 200 bars. After an impregnation time of 2 hours 0.05 mL 0.2 M DEPDC in hexane mixture is injected together with $CO_2$ to ensure a pressure of 300 bars. After the polymerization has ended the pressure is slowly released and the reactor is cooled. The produced IPN is cleaned in EtOH to remove excess polymer material.

The final treated disc will be transparent and have an outer coating of polymer polymerized from the HEMA and HFBA.

Example 2

Example 2 is carried out as example 1 but with the difference that the cross-linking agent is EGDMA.

The final treated disc will be transparent and have an outer coating of polymer polymerized from the HEMA and HFBA. The cross-linking degree will be higher than the cross-linking degree obtained in example 1.

Example 3

Example 3 is carried out as example 1 but with the difference that the impregnation is performed under condition (pressure Temperature) where the $CO_2$ is in liquid state.

The final treated disc will be transparent and have an outer coating of polymer polymerized from the HEMA and HFBA. The amount of interpenetrating polymer is less than the amount of interpenetrating polymer obtained in example 1.

Example 4

Example 4 is carried out as example 1 but with the difference that the monomer is added simultaneously with the radical starter and the co-solvent, where after the reactor is heated to 75° C. and $CO_2$ is added to assure a pressure of 200 bars for impregnation.

The final treated disc will be transparent and have an outer coating of polymer polymerized from the HEMA and HFBA. The quality is as high as in example 1.

The invention claimed is:

1. A method of producing an article comprising an interpenetrating polymer network (IPN) comprising
   i) providing a polymer substrate and applying it in a reaction chamber,
   ii) providing at least one monomer for an interpenetrating polymer,
   iii) exposing said polymer substrate in said reaction chamber to said at least one monomer in the presence of an impregnation solvent comprising $CO_2$ under conditions wherein said $CO_2$ is in its liquid or supercritical state and
   iv) polymerizing said at least one monomer to form an interpenetrating polymer in the presence of a polymerization solvent under conditions wherein at least a part of said at least one monomer is not impregnated in the substrate and is present in the reaction chamber dissolved in said polymerization solvent in a concentration which is sufficient for generation of a coating of at least a part of a surface of the substrate,
   said method optionally comprising cross-linking of the interpenetrating polymer.

2. A method of producing an article according to claim 1, wherein said polymer substrate is selected from the group of rubber substrates and polymer substrates comprising a carbon-carbon backbone.

3. A method of producing an article according to claim 2, wherein said polymer substrate is selected from silicone rubber, isoprene rubber, urethane rubber, ethylene-acrylate rubber (EPCM), ethylene propylene diene monomer rubber (EPDM), nitrile rubber (NBR), styrene-butadiene rubber (SBR) and latex.

4. A method of producing an article according to claim 1, wherein said polymer substrate is selected from polyolefins, polyvinyls, polyesters, polyacrylates, polyethers, polyurethane, polycarbonate, SEBS, SBS, SIS, TPE-polyetheramide, TPE-polyether-ester, TPE-urethanes, TPE PP/NBR, TPE-PP/EPDM, TPE-vulcanisates TPE-PP/IIR, and mixtures thereof.

5. A method of producing an article according to claim 1, wherein said at least one monomer is selected such that the interpenetrating polymer is different in composition from the polymer substrate.

6. A method of producing an article according to claim 1, wherein said at least one monomer being a free radical polymerizable monomer.

7. A method of producing an article according to claim 1, wherein said at least one monomer in polymerized condition has at least one physical property which is different from said at least one physical property of said polymer substrate.

8. A method of producing an article according to claim 1 wherein one or both of said impregnation solvent and said polymerization solvent comprises at least 10% by weight of one or more of the components selected from $CO_2$, $N_2O$, and $C_1$-$C_5$ hydrocarbons.

9. A method of producing an article according to claim 1, wherein one or both of said impregnation solvent and said polymerization solvent further comprises a surfactant.

10. A method of producing an article according to claim 1, wherein one or both of said impregnation solvent and said polymerization solvent further comprises a co-solvent.

11. A method of producing an article according to claim 1, wherein a radical starter is incorporated into said polymer substrate.

12. A method of producing an article according to claim 1, wherein said polymer substrate is exposed to said monomer(s) and said impregnation solvent for a sufficient time to impregnate a sufficient amount of said at least one monomer into said polymer substrate for providing an interpenetrating polymer from said monomer(s) into a depth of at least 1 μm of said polymer substrate upon polymerization of said at least one monomer.

13. A method of producing an article according to claim 1, wherein said polymer substrate is exposed to said monomer(s) and said impregnation solvent under conditions where $CO_2$ is in its liquid and/or its supercritical state under conditions where polymerization of said at least one monomer is not initiated and for a sufficient time to impregnate a sufficient amount of said at least one monomer into said polymer substrate for providing an interpenetrating polymer from said monomer(s) into a depth of at least 1 µm of said polymer substrate upon polymerization of said at least one monomer.

14. A method of producing an article according to claim 1, wherein said polymer substrate is exposed to said monomer(s) and said impregnation solvent at a first pressure and a first temperature, followed by increasing at least one of the pressure and the temperature to thereby initiate polymerization of said monomer(s).

15. A method of producing an article according to claim 1, wherein said polymer substrate is exposed to said monomer(s) and said impregnation solvent where after the polymerization of said monomer(s) is initiated using UV light.

16. A method of producing an article according to claim 1, wherein said polymer substrate is exposed to said monomer(s) and said impregnation solvent for a sufficient time to impregnate at least a part of said monomer(s) where after the impregnation solvent is removed and a polymerization solvent is introduced and polymerization of said monomer(s) is initiated.

17. A method of producing an article according to claim 1, wherein the polymerization of said monomer(s) is performed under conditions where a layer of polymer is polymerized from said monomer(s) onto at least one surface part of said polymer substrate.

18. A method of producing an article according to claim 1, wherein the said polymer substrate is exposed to at least two monomers under conditions where said $CO_2$ is in its liquid or supercritical state, said interpenetrating polymer network being formed from said at least two monomers, said interpenetrating polymer network being formed from said at least two monomers.

19. A method of producing an article according to claim 1, wherein the said polymer substrate is exposed to at least two monomers and said interpenetrating polymer network being formed from said at least two monomers to form an alternating co-polymer, a block co-polymer or a random co-polymer.

20. A method of producing an article according to claim 1, wherein said resulting article has at least one physical property which is different from said at least one physical property of said polymer substrate, said at least one physical property being selected from hardness, permeability, stiffness, hydrophilic character, glass transition temperature (Tg) and refractive index (RI).

* * * * *